F. M. CASE.
FISHING REEL.
APPLICATION FILED AUG. 15, 1916.
1,344,289.
Patented June 22, 1920.
2 SHEETS—SHEET 2.
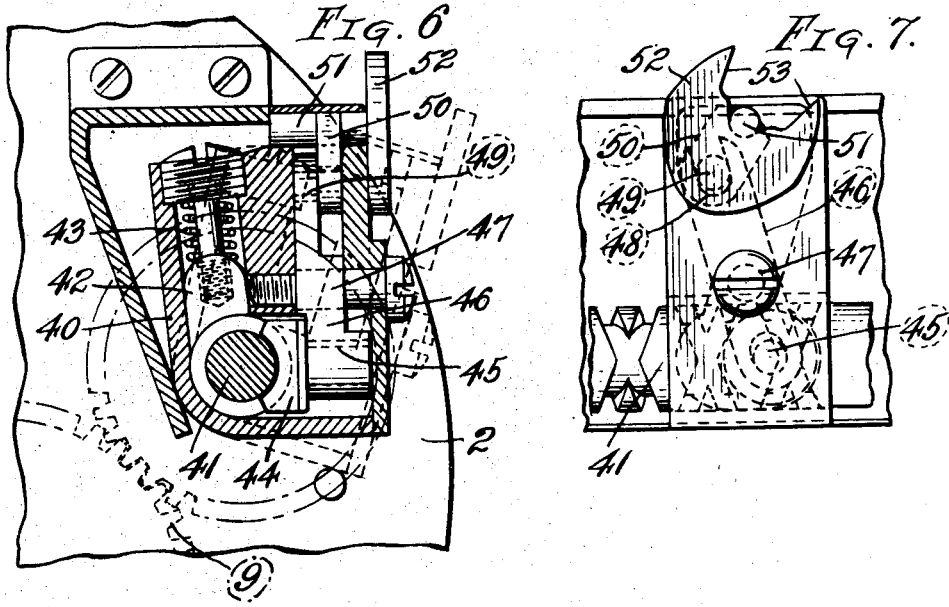
Inventor.
Francis M. Case
By Brockett and Hyde
Atty's

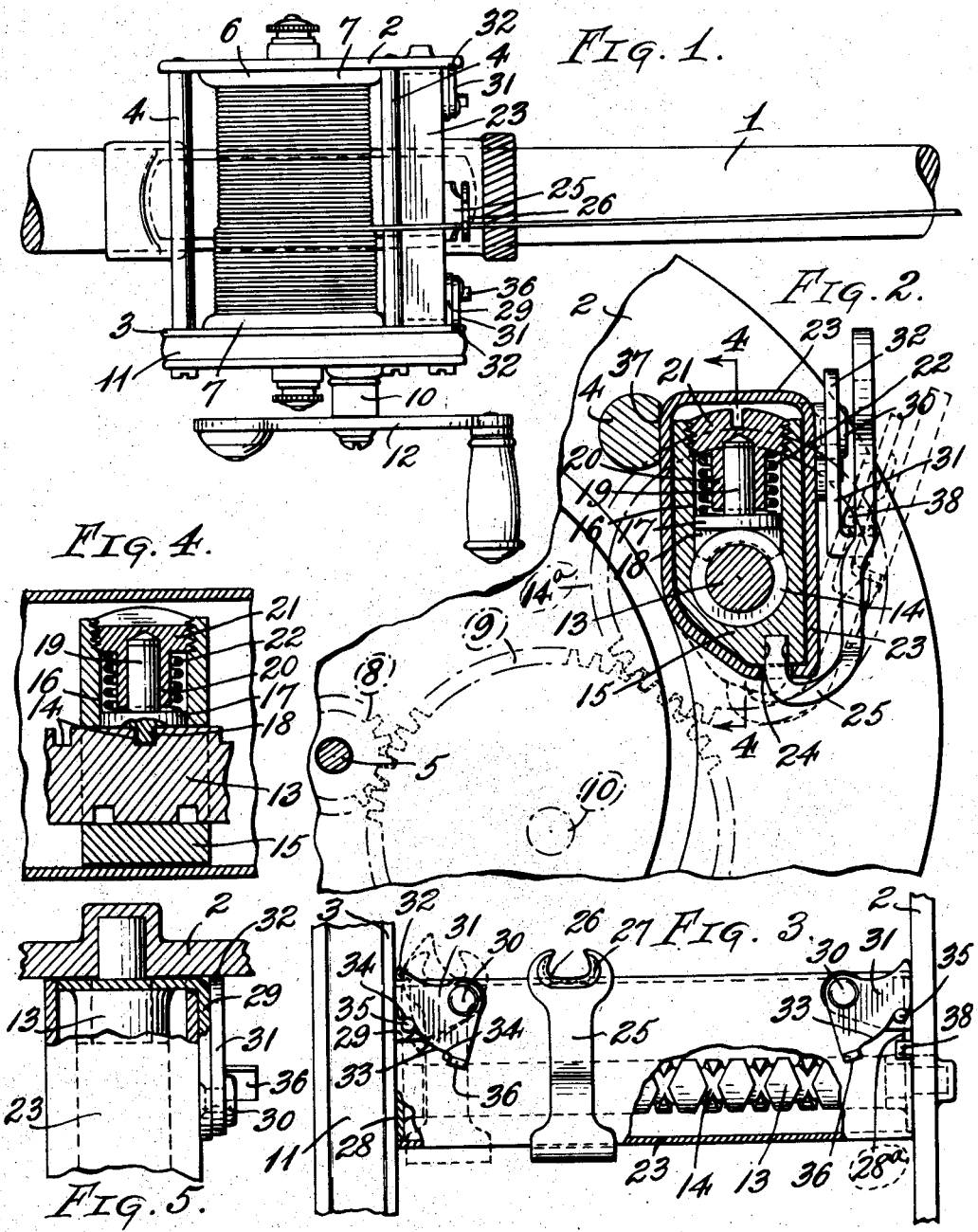

UNITED STATES PATENT OFFICE.

FRANCIS M. CASE, OF CLEVELAND, OHIO, ASSIGNOR TO THE ENTERPRISE MANUFACTURING COMPANY, OF AKRON, OHIO, A CORPORATION OF OHIO.

FISHING-REEL.

1,344,289.      Specification of Letters Patent.      Patented June 22, 1920.

Application filed August 15, 1916. Serial No. 115,058.

*To all whom it may concern:*

Be it known that I, FRANCIS M. CASE, citizen of the United States, residing at Cleveland, in the county of Cuyahoga and State of Ohio, have invented certain new and useful Improvements in Fishing-Reels, of which the following is a specification.

This invention relates to fishing reels and particularly to mechanism for producing what is termed in the art as a level wind of the line upon the reel.

In a fishing reel of the level wind type it has been customary to employ an eye or guide for the line together with mechanism for moving the eye or guide back and forth across the spool, for throwing the guide out of the path of the line when reeling out and for picking up the line and leading it into the eye or guiding device at each end of its travel and the present invention relates to mechanism for more positively and more effectively performing this operation on a reel of this type.

The invention also relates to a casing structure for the spirally grooved shaft for the line laying mechanism.

The invention may be further briefly summarized as consisting in the construction and combination of parts hereinafter set forth in the drawings, description and claims.

Referring to the drawings Figure 1 is a plan view of the device applied to a portion of a pole; Fig. 2 is a view partly in section and partly in elevation showing the construction of the line laying mechanism; Fig. 3 is a view in front elevation of this mechanism; Fig. 4 is a sectional view of the line laying mechanism taken on substantially the line 4—4 of Fig. 2; Fig. 5 is a detail top plan view partly in section of the right hand end of the line laying mechanism as shown in Fig. 3; Fig. 6 is a sectional view corresponding to Fig. 2, and showing a modification; and Fig. 7 is an elevation from the right in Fig. 6.

In the embodiment shown the pole is indicated at 1 and the reel structure is applied to this pole in the usual way.

The reel structure comprises two end plates 2 and 3 secured together by cross rods 4 in the usual way to form a frame. Rotatably mounted in this frame is a spool supporting shaft 5 upon which is mounted the spool 6 of any preferred construction. This spool is free for rotation in the frame. The spool has ends 7 of the usual configuration.

Secured to the shaft 5 is a pinion 8 meshing with a gear 9 mounted on a short shaft 10 supported in a suitable bearing in a gear casing member 11 secured to the plate 3. A crank 12 is secured to the short shaft 10 for rotating the shaft and the gear 9.

Mounted in bearings in the end plates 2 and 3 is a feeding shaft 13 having reversely extending spiral grooves 14 of a well known type. This shaft 13, within the gear casing 11 is provided with a driving pinion 14ª which meshes with the gear 9. Loosely mounted on the shaft 13 is a sliding block 15 provided with a recess 16 extending radially from the shaft and receiving a nut member 17 having a projection 18 adapted to engage in either of the grooves and capable of transference from one to the other at the ends of the grooves in a well known manner. This nut member is further provided with a shank 19 engaging in a hollow extension 20 integral with a plug 21 threaded into the opening 16 as shown. A spring 22 is arranged between the nut member and the plug for holding the former in place and for creating a tension between the parts for a purpose to be described.

Inclosing the shaft 13 and the sliding block 15 is a housing 23 having a slot 24 at the bottom below the shaft 13 for a fish line guiding arm 25 which is attached to the block 15 and extends upward along the front of the housing to a point slightly above the top of the housing and at this point the arm is provided with a fish line guiding recess 26 receiving a hard line engaging piece 27 secured in place by bending or forming the metal in the recess about the piece 27, and which, for example, may be made of agate, steel or other suitable material.

The left end of the housing, as shown in Fig. 3, is closed by a cap or end plate 28 secured in place in any preferred manner and having an ear 29 extending along the front of the housing as shown. This ear 29 is provided with a pin 30 upon which is pivoted a trip 31 having an upwardly extending projection 32 for engaging the line and a recess 33 near one edge forming stop shoulders 34 adapted for engagement with a stop pin 35 secured in the corresponding ear of the housing. A lug 36 extends outward from the front of the trip in a position in the path of the arm 25 such that the projection 32 is rocked in a manner to lead the fish line into the recess of the guiding arm 25 as it approaches the trip. There is one of these trips at each end of the path of movement of the arm 25 and they are alike except that they are the reverse of each other in structure.

The cap or end plate 28ª at the right as shown in Fig. 3 is removable, when this part of the entire mechanism is removed from the reel, for convenience and for providing access to the spirally grooved shaft and the other parts within the housing.

The housing 23 when the line is being wound upon the spool normally engages the flattened side 37 of one of the rods 4 but when the line is being reeled off the drag or friction between the parts and created by the spring 22 serves to cause the rotation of the shaft 13 to swing the housing outward against the stop pin 38 secured in one of the end plates thereby limiting the outward movement and withdrawing the guiding device from the path of the line so that it may reel out freely.

It will be seen from the foregoing description that the housing protects the spirally grooved shaft from water and grit and that the trips will raise and lead the line into the guiding recess of the guide at either end of the path of movement of the guide.

In the modification shown in Figs. 6 and 7, the block 40 is frictionally held upon the screw shaft 41 by a yielding pressure member 42 backed by a spring 43. The drag of said pressure member causes the level wind mechanism, including the block, to swing from the full line to the dotted line position, Fig. 6, or vice versa, as the screw shaft is rotated in one direction or the other, as before described. The pressure member does not however engage the spiral grooves of the shaft, but said grooves are engaged by the nut member 44 having a stem 45 engaging a slot in one arm of a small lever 46 pivoted at 47 to the block 40, and whose other arm has a slot 48 to receive a pin 49 on an arm 50 carried by a shaft 51, to which is secured the line engaging member 52. Said member has two prongs 53 adapted to alternately engage behind the line and shift it back and forth along the spool as the spool winds it in.

With this arrangement the first motion of rotation of the screw shaft moves the nut member longitudinally of the screw shaft and in advance of the block 40 and thereby oscillates the lever and shifts the line engaging device. Said device is shifted at each end of the movement of the block 40 along the screw shaft so as to always elevate one or the other of the prongs 53 behind the line and lay it evenly on the spool.

Having described my invention, I claim:—

1. In a fishing reel, a frame, a spool mounted therein, means for rotating said spool to wind the line thereon, a line guide having a line receiving recess, means for traversing said guide back and forth to lay the line on the spool, and movable means operating at each end of the path of travel of said guide for raising the line into said recess.

2. In a fishing reel, a frame, a spool mounted therein, means for rotating said spool to wind the line thereon, a line guide having a line recess, means for moving said guide from side to side to lay the line, and movable means located at the end of the path of travel of said guide and actuated thereby for raising the line into said recess.

3. In a fishing reel, a frame, a spool mounted therein, means for rotating said spool to wind the line thereon, a line guide having a line recess, means for moving said guide from side to side to lay the line, and trips one arranged at each end of the path of travel of said guide for raising and leading the line into said recess.

4. In a fishing reel, a frame, a spool mounted therein, means for rotating said spool to wind the line thereon, a line guide having a line recess, means for moving said guide from side to side to lay the line, and pivoted trips one arranged at each end of the path of travel of said guide for raising and leading the line into said recess.

5. In a fishing reel, a frame, a spool rotatably mounted therein, means for rotating said spool and level wind mechanism comprising a spirally grooved shaft, a housing pivoted thereon and having a slot in the bottom, a sliding block within said housing, a nut member carried by said block and engaging said spirally grooved shaft, a guide arm adapted to be actuated by said block and having a recess, and means located at the ends of the path of travel of said arm for raising and leading the line into said recess.

6. In a fishing reel, a frame, a spool rotatably mounted therein, means for rotating said spool and level wind mechanism comprising a spirally grooved shaft, a housing pivoted thereon and having a slot in the bottom, a sliding block within said housing, and having an opening for receiving said spirally grooved shaft with an opening radially disposed with respect to said shaft, a nut member having a projection for engagement in the grooves of the said shaft, means for creating a tension between said nut and said block, a guide arm projecting through the slot in said housing and adapted to be moved along said housing by said sliding block and having a guiding recess for receiving the line, and means located at the ends of the housing in the path of movement of the guiding arm for raising and leading a line into said recess.

7. In a fishing reel, a frame, a spool rotatably mounted therein, means for rotating said spool and level wind mechanism comprising a spirally grooved shaft, a housing pivoted thereon and having a slot in the bottom, a sliding block within said housing, and having an opening for receiving said spirally grooved shaft with an opening radially disposed with respect to said shaft, a nut member having a projection for engagement in the grooves of said shaft, means for creating a tension between said nut and said block, a guide arm projecting through the slot in said housing and adapted to be moved along said housing by said sliding block and having a guiding recess for receiving the line, and a pair of tripping devices one arranged at each end of the path of movement of said arm and each comprising a pin mounted in the housing, a trip pivoted on said pin, means for limiting the movement of said trip, and means whereby said arm at each end of its path of movement oscillates said trip.

8. In a fishing reel, a frame, a spool rotatably mounted therein, means for rotating said spool and level wind mechanism comprising a spirally grooved shaft, a housing pivoted thereon and having a slot in the bottom, a sliding block within said housing, and having an opening for receiving said spirally grooved shaft with an opening radially disposed with respect to said shaft, a nut member having a projection for engagement in the grooves of said shaft, means for creating a tension between said nut and said block, a guide arm projecting through the slot in said housing and adapted to be moved along said housing by said sliding block and having a guiding recess for receiving the line, and a pair of tripping devices one arranged at each end of the path of movement of said arm and each comprising a pin mounted in the housing, a trip pivoted on said pin, means for limiting the movement of said trip, and means carried by the trip for engagement by the arm.

9. In a fishing reel, a frame, a spool rotatably mounted therein, means for rotating said spool and level wind mechanism comprising a spirally grooved shaft, a housing pivoted thereon and having a slot in the bottom, a sliding block within said housing, and having an opening for receiving said spirally grooved shaft with an opening radially disposed with respect to said shaft, a nut member having a projection for engagement in the groove of said shaft, means for creating a tension between said nut and said block, a guide arm projecting through the slot in said housing and adapted to be moved along said housing by said sliding block and having a guiding recess for receiving the line, and a pair of tripping devices one arranged at each end of the path of movement of said arm and each comprising a pin mounted in the housing, a trip pivoted on said pin, means for limiting the movement of said trip, and a lug carried by the trip for engagement by the guiding arm.

10. In a fishing reel, a frame, a spool rotatably mounted therein, means for rotating said spool and level wind mechanism comprising a spirally grooved shaft, a housing pivoted thereon and having a slot in the bottom, a sliding block within said housing, and having an opening for receiving said spirally grooved shaft with an opening radially disposed with respect to said shaft, a nut member having a projection for engagement in the grooves of said shaft, a shank, a plug in said radially disposed opening, a spring arranged between said plug and said nut member, a guide arm adapted to be actuated by said sliding block and having a guiding recess, end plates for said housing having ears extending along the front of the housing one of said end plates being removable, pivot pins mounted in said ears, trips mounted upon said pivot pins and each provided with a recess near its edge forming stop shoulders and a projection for engaging the line, and a lug carried by each trip and arranged in the path of the guide arm, and pins arranged in the ears of the end plates of the housing for limiting the movement of the trips.

11. In a fishing reel, a frame, a spool rotatably mounted therein, means for rotating said spool and level wind mechanism comprising a spirally grooved shaft, a housing pivoted thereon and having a slot in the bottom, a sliding block within said housing, and having an opening for receiving said spirally grooved shaft with an opening radially disposed with respect to said shaft, a nut member having a projection for engagement in the groove of said shaft, a shank, a plug in said radially disposed opening, a spring arranged between said plug and said nut member, a guide arm adapted to be actuated by said sliding block and having a guiding recess, end plates for said housing having ears extending along the front of the housing one of said end plates being removable, pivot pins mounted in said ears, trips mounted upon said pivot pins and each provided with a recess near its edge forming stop shoulders and a projection for engaging the line, and a lug carried by each trip and arranged in the path of the guide arm, and means for limiting the swinging movement of the housing whereby in normal position the recess of the guide arm is in a position to receive the line and in reeling-off position the guide arm is entirely out of the path of the line.

12. In a fishing reel, a frame, a spool rotatably mounted therein, means for rotating said spool, level winding mechanism comprising a spirally grooved shaft, a sliding block carried thereby, a guiding arm actuated by said block, a housing entirely inclosing the grooved shaft and sliding block and pivotally mounted upon the spirally grooved shaft, means for limiting the swinging movement of said housing, whereby the guiding arm may assume an operative and an inoperative position, and means for causing the rotation of said grooved shaft to swing said housing into either of its two positions.

13. In a fishing reel, a frame, a spool rotatably mounted therein, means for rotating said spool, level winding mechanism comprising a spirally grooved shaft, a sliding block carried thereby, a guiding arm actuated by said block, a housing entirely inclosing the grooved shaft and sliding block and pivotally mounted upon the spirally grooved shaft, means for limiting the swinging movement of said housing whereby the guiding arm may assume an operative and an inoperative position, and a tension device between the sliding block and the grooved shaft for causing the rotation of the grooved shaft to swing the housing into either of its two positions.

14. In a fishing reel, a frame, a spool rotatably mounted therein, means for rotating said spool, a level winding mechanism comprising a spirally grooved shaft mounted in the frame, a sliding block mounted upon said spirally grooved shaft, a guide arm carried by said block, a nut carried by said block for engaging the groove in said shaft, a tension device between the nut and the block, a housing inclosing said block and adapted to guide the same transversely, said housing being pivotally mounted with respect to the frame, and means for limiting the swinging movement of said housing whereby it may assume either an operative or an inoperative position according to the direction of rotation of the grooved shaft.

15. In a fishing reel, a frame, a spool rotatably mounted therein, means for rotating said spool, a level winding mechanism comprising a spirally grooved shaft mounted in the frame, a sliding block mounted upon said spirally grooved shaft, a guide arm carried by said block, a nut carried by said block for engaging the groove in said shaft, a tension device between the nut and the block, a housing inclosing said block and adapted to guide the same transversely, said housing being pivotally mounted with respect to the frame, a pillar back of said housing for limiting its movement for the operative position thereof, and a pin for limiting its outward movement for the inoperative position thereof.

In testimony whereof I affix my signature.

FRANCIS M. CASE.